United States Patent Office 3,530,152
Patented Sept. 22, 1970

3,530,152
NOVEL BIS TETRAPHENYLMETHANES
Emery G. Tokoli, Princeton, N.J., assignor to Minnesota Mining and Manufacturing Company, St. Paul, Minn., a corporation of Delaware
No Drawing. Filed July 27, 1966, Ser. No. 568,111
Int. Cl. C09b 11/10
U.S. Cl. 260—390
9 Claims

ABSTRACT OF THE DISCLOSURE

Compounds of the formula $$Q-Ar'-\underset{\underset{Ar}{|}}{\overset{\overset{Y}{|}}{C}}-Ar''-D-Ar''-\underset{\underset{Ar\ Q}{|}}{\overset{\overset{Ar}{|}}{C}}-Ar'-Y$$

wherein each Ar is phenyl or halophenyl, each Ar' is phenyl having no substitutents other than Y and Q, each Ar'' is unsubstituted phenylene, D is —O—, —S—, —NH— or —CH$_2$—, each Y is NH$_2$, OH, SH or H, and each Q is NH$_2$, OH or SH. These compounds can be used as intermediates in the preparation of polymers. They can also be reacted through the Q groups with compounds such as long chain isocyanates to form surfactants.

---

This invention relates to the preparation of certain high molecular weight aromatic compounds. More particularly the invention relates to the preparation of di and polyfunctional bis tetraarylmethanes.

It is an object of the invention to provide certain high molecular weight aromatic compounds which are useful as chemical intermediates.

It is another object of the invention to provide intermediates in the preparation of surfactants.

It is another object of this invention to provide certain di, tri and tetra functional compounds that can be used to prepare useful highly aromatic polymers.

It is another object of the invention to provide high molecular weight reactive compounds.

Other objects of the invention will be apparent from the disclosures hereinafter made.

In accordance with the above and other objects of the invention, it has been found that polyfunctional bis tetra-arylmethanes which are valuable intermeditaes for the preparation of various polymers can be prepared.

These bis tetraarylmethane derivatives have the structural formula:

$$Q-Ar'-\underset{\underset{Ar}{|}}{\overset{\overset{Y}{|}}{C}}-Ar''-D-Ar''-\underset{\underset{Ar\ Q}{|}}{\overset{\overset{Ar}{|}}{C}}-Ar'-Y$$

wherein each Ar is phenyl or halophenyl, each Ar' is phenyl having no substituents other than Y and Q, each Ar'' is unsubstituted phenylene, D is —O—, —S—, —NH— or —CH$_2$—, each Y is NH$_2$, OH, SH or H, and each Q is NH$_2$, OH or SH.

In general, the reactions of the process of the invention can be characterized as follows:

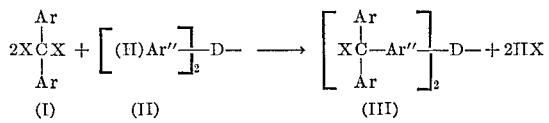

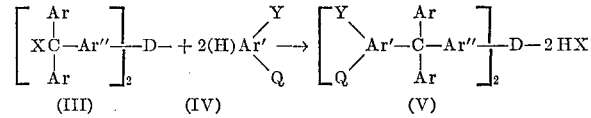

wherein Ar, Ar', Ar'', D, Q and Y as previously defined, X is chlorine or bromine and (H) is a replaceable aromatic hydrogen atom.

The first step in this process, i.e. the preparation of compounds of type III, is carried out in a solution using a suitable inert solvent, such as carbon disulfide or tetra chloroethylene, at a temperature ranging from about 40 to 150° C. in the presence of a condensation catalyst. Effective catalysts for this reaction are anhydrous Lewis acids (also known as Friedel-Crafts catalysts) such as aluminum chloride, aluminum bromide, ferric chloride, antimony pentachloride, molybdenum pentachloride, indium trichloride, gallium trichloride, etc.

The first halogen atom is removed from compound I quite easily in its reaction with II to form III. Once III is formed, however, the reaction stops since compounds of this type are quite stable. When the preferred catalyst, aluminum chloride, is used, a stable complex is formed between the product (compound III) and the aluminum chloride. This complex can be decomposed with water and the desired product isolated.

In the final step of the process, the remaining halogen (X) is removed, utilizing the more reactive compound IV. The step is carried in either a melt or a solution and ordinarily at a temperature ranging from 100 to 200° C. A catalyst is generally not needed although a condensation catalyst (such as those listed above) is desirable in some cases. An inert solvent, such as tetrachloroethylene, or an organic carboxylic acid, such as acetic acid or propionic acid, can also be utilized.

Among the specific intermediate compounds useful in preparing the compounds of the invention are the following:

(I) Diphenyl dichloromethane, diphenyl dibromomethane, p,p'-dichlorodiphenyl dichloromethane, 2,4-dichloropenyl phenyldichloromethane and 2,4-dibromophenyl phenyldichloromethane.
(II) Diphenyl ether, diphenyl thioether, diphenyl amine and diphenyl methane;
(III) Phenol, o-mercaptophenol, o-aminophenol, aniline, thiophenol, catechol, o-phenylene diamine, o-aminothiophenol, etc.

The compounds of the invention are useful as chemical intermediates. They can, for example, be reacted through the Q groups with compounds capable of reacting therewith and containing long chain alkyl groups to form surfactants. Thus a long chain isocyanate, such as octadecyl isocyanate, can be reacted with compounds of the invention to form surfactants.

The compounds of the invention are also useful intermediates in the preparation of polymers. Those in which one or both Y groups are other than hydrogen are trior tetrafunctional and in some cases will form heteroaromatic polymers such as benzimidazoles (where Y and Q are both amino and are ortho oriented) or benzoxazoles (where Y is amino and Q is hydroxy and they are ortho oriented). When both Y and Q are hydroxy, branched and crosslinked polymers can be obtained. The dihydroxy bis tetraphenylmethanes can be reacted with diacidchlorides to form polyesters and with phosgene to prepare polycarbonates and the diamino bis tetraphenylmethanes can be reacted with dicarboxylic anhydrides to form polyimides. Compounds of the invention having still other Y and Q groups (e.g. mercaptans) are monomers for additional types of polymers.

Among the diacid chlorides useful as comonomers with the diols of the invention to form polyester are terephthaloyl chloride, isophthaloyl chloride, phthaloyl chloride, naphthalene 2,6-diacidchloride and napthalene 1,8-diacidchloride. Among the dianhydrides suitable for reaction with the diamines of the invention to form first the respective polyamide acids and then, after additional heating at high temperature, the polyimides are those listed in U.S. Pat. 3,179,634 at column 6, lines 35 and following.

The polymers prepared from the compounds of the invention are generally thermally and oxidatively stable (assuming that suitable coreactants are selected) and can be linear or crosslinked, as desired. They find uses in many areas, e.g. in shaped objects, as coating materials for various substrates, as filaments, unsupported films, etc.

Having described the invention in broad terms it is now more specifically illustrated by examples showing the best mode presently contemplated of practicing the invention. In these examples, where not otherwise indicated, parts of solids are by weight and of liquids by volume and temperatures are in degrees centigrade.

THE COMPOUNDS OF THE INVENTION

Example 1

The preparation of bis-(trityl chloride) ether.

The 5-liter flask fitted with a stirrer, thermometer, and a condenser is charged with benzophenone dichloride (471.4 g. 1.97 mole), diphenyl ether (169.0 g., 0.99 mole), and 2 liters of tetrachloroethylene. The solution is cooled to 10° and $AlCl_3$ (268.0 g., 1.97 mole) is added at such a rate that the temperature does not exceed 17°. The cooling bath is removed and the mixture is slowly warmed to reflux and maintained at this temperature until the evolution of gas ceases.

The mixture is then cooled to 25° and divided into five portions. Each portion is mixed with 80 ml. of water and beaten in a blender until a white color appears. The material is then filtered and the organic filtrates are combined. Hexane (400 ml.) is added and the solution is cooled and allowed to stand for 2 hours. The material is then filtered; the filter cake is washed with hexane and dried to give 357 g. (62.7%) of a white product, M.P. 173–175° C.

In a second preparation of the same compound, a white product melting at 175–177° C. is obtained. Analytical results on this material are as follows:

Calc'd for $C_{39}H_{29}OCl_2$ (percent): C. 79.8; H, 4.9; Cl, 12.9. Found (percent): C. 80.2; H, 5.1; Cl, 12.3.

Example 2

The preparation of bis-(p-hydroxyphenyltriphenylmethane)ether.

Bis-(tritylchloride)ether (11.4 g., 0.02 mole) and phenol (28.2 g., 0.3 mole) are mixed in a flask and heated on an oil bath for 4 hours at 130–160°. The flask is cooled and the contents are removed and slurried in glacial acetic acid. The mixture is filtered; and the white filter cake is washed with acetic acid, and methanol; and dried in vacuum to give 12 grams (87%) of product, M.P. 325–327°.

*Analysis.*—Calc'd for $C_{50}H_{38}O_3$ (percent): C, 87.43; H, 5.58. Found (percent): C, 86.0; H, 5.64.

This bisphenol, despite its high melting point, is readily soluble in dioxane.

EXAMPLE 3

The preparation of bis-(p-aminophenyltriphenylmethane) ether.

A 100 ml. flask fitted with a magnetic stirrer, thermometer, and a condenser, is charged with bis-(tritylchloride) ether (11.4 gr., 0.02 mole), aniline hydrochloride (13.0 g., 0.1 mole), and 50 ml. of acetic acid. The resulting thick slurry is heated to reflux and maintained at this temperature until the theoretical quantity of HCl is evolved. The material is filtered; the filter cake is washed free of mother liquor with acetic acid; and dried to give 11.9 g., (79%) of a purple product, M.P. 244–250°.

The amine hydrochloride is converted to the free amine by suspending the salt in aqueous methanol and treating with methanolic sodium hydroxide. The white amine is filtered and dried, M.P. 301–304°. This diamine, despite its high melting point, is readily soluble in tetrahydrofuran and dioxane.

*Analysis.*—Calculated: N.E. 343. Found: N.E. 351.

In a similar manner, the additional compounds shown below are prepared (the reactants and products of the invention being designated by Roman numerals as hereinbefore).

| Example Number | I | II | IV | V |
|---|---|---|---|---|
| 4 | Cl-C(C₆H₄Cl)₂-Cl (bis(chlorophenyl)dichloromethane) | C₆H₅-O-C₆H₅ (diphenyl ether) | C₆H₅-NH₂ (aniline) | [H₂N-C₆H₄-C(C₆H₄Cl)₂-C₆H₄-]₂O |
| 5 | Cl-C(C₆H₄Cl)(C₆H₅)-Cl | C₆H₅-S-C₆H₅ (diphenyl sulfide) | Same as above | [H₂N-C₆H₄-C(C₆H₄Cl)(C₆H₅)-C₆H₄-]₂S |

TABLE—Continued

| Example Number | I | II | IV | V |
|---|---|---|---|---|
| 6 | 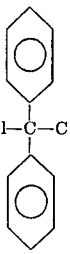 | 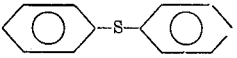 |  | 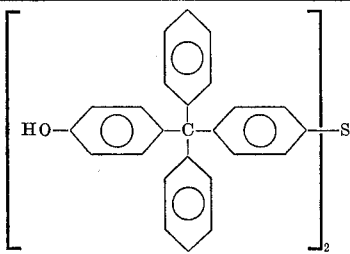 |
| 7 | Same as above |  | 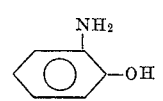 | 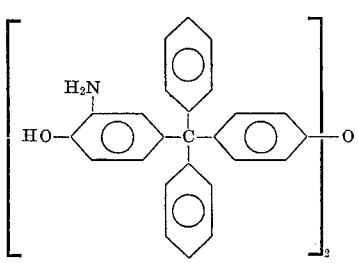 |
| 8 | ......do...... | Same as above | 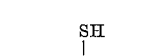 | 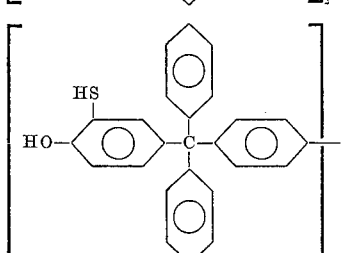 |
| 9 | 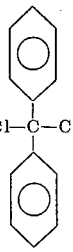 | 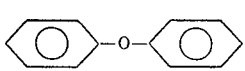 |  | 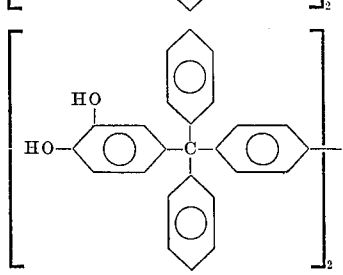 |
| 10 | Same as above | Same as above |  | 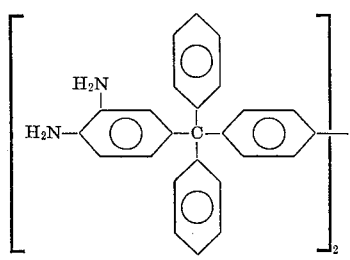 |
| 11 | ......do...... | ......do...... |  | 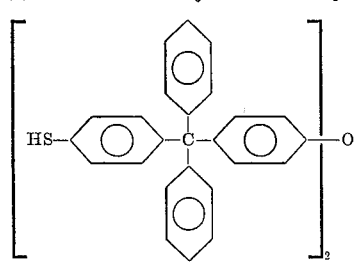 |

*Melting point 223–225° C.

POLYMERS PREPARED FROM THE COMPOUNDS OF THE INVENTION

Example 14

Preparation of a polyimide from bis (p-aminophenyltriphenylmethane) ether and pyromellitic dianhydride.

Bis-(p-aminophenyltriphenylmethane) ether (3.505 g., 0.01 equivalent) is weighed into a container under $N_2$. Dry dimethylacetamide (44.2 ml.) is added and the solution is cooled. While a $N_2$ atmosphere is maintained pyromellitic dianhydride (1.091 g., 0.01 equivalent) is added with vigorous stirring. The inherent viscosity of the resulting solution is 0.36 (measured as a 1% solution of polymer in dimethylacetamide).

The material is imidized with heat and a film is cast that is soluble in $CHCl_3$ and $CH_2Cl_2$.

Similarly useful polyimides can be prepared from the other diamines of the invention.

Example 15

Preparation of a polycarbonate from bis-(p-hydroxyphenyltriphenylmethane) ether and phosgene.

A 100 ml. four-neck flask fitted with a thermometer, stirrer, condenser and a bubbler for the introduction of phosgene is dried and flushed with nitrogen for 15 minutes. Bis-(p-hydroxyphenyltriphenylmethane) ether (4.3 g., 0.0063 mole) and 50 cc. of pyridine are placed in the flask and the mixture is heated to 90° to dissolve the diphenol. The solution is cooled to 25°; phosgene is then added with gentle stirring. The temperature is maintained at 25–30° by means of an ice-water bath, applied as necessary.

When a yellow color develops, the phosgene addition is stopped and a little bisphenol-pyridine solution is added. The mixture is stirred until practically all the color is discharged. The polymer is isolated by pouring the mixture into four times its volume of water with vigorous stirring. The precipitate is filtered; washed with water; and suspended in 500 ml. of water at 80° for 15 minutes. The polymer is filtered; washed with water; and dried in vacuum at 90° to yield 4.7 g. of the white polycarbonate. The infrared spectrum of this material confirms its identity as the polycarbonate.

Similarly, useful polycarbonates can be prepared from the other dialcohols of the invention.

Example 16

Preparation of a polyester from bis-(p-hydroxyphenyltriphenylmethane) ether and terphthaloyl chloride.

A 50 ml. flask fitted with a $N_2$ flush, stirrer, and a condenser is charged, in a $N_2$ filled glove box, with bis-(p-hydroxyphenyltriphenylmethane) ether 5.088 g., 0.015 eq.) terphthaloylchloride (1.523 g., 0.015 eq.) and 35 ml. of a chlorinated high boiling aromatic solvent. While a $N_2$ atmosphere is maintained the mixture is heated. When the temperature reaches 224° the gas begins to evolve and a light brown solution results. The solution is heated to 300–330° and maintained at this temperature for 1 hour, then cooled and poured into 500 ml. of heptane, whereupon a white fibrous material appears. This material is isolated by filtration, washed with heptane, and dried to give 6.1 g. of a white product; $<\eta>=0.55$ (measured as a 0.5% solution of polymer in chloroform). Its infrared spectrum indicates that it is a polyester. It is found to be soluble in $CH_2Cl_2$, $CHCl_3$, chlorobenzene, etc. A long term heat aging study shows a 10% weight loss in 85 hours at 600° F. in air, and 680 hours at 500° F.

What is claimed is:
1. A compound having the formula

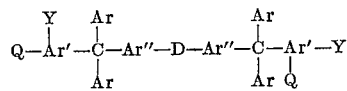

wherein each Ar is phenyl or halophenyl, each Ar' is phenyl having no substituents other than Y and Q, each Ar" is unsubstituted phenylene, D is —O—, —S—, —NH— or —$CH_2$—, each Y is $NH_2$, OH, SH or H, and each Q is $NH_2$, OH or SH.

2. A compound according to claim 1 wherein each Ar is phenyl.

3. A compound according to claim 1 wherein Q is hydroxyl and Y is hydrogen.

4. A compound according to claim 2 wherein Q is hydroxyl and Y is hydrogen.

5. A compound according to claim 1 wherein Q is amino and Y is hydrogen.

6. A compound according to claim 2 wherein Q is amino and Y is hydrogen.

7. Bis (p-hydroxyphenyltriphenylmethane) ether.
8. Bis (p-aminophenyltriphenylmethane) ether.
9. Bis (p-aminophenyltriphenylmethane) thioether.

References Cited

UNITED STATES PATENTS 3,196,159    7/1965    Laszlo _____ 260—390

LORRAINE A. WEINBERGER, Primary Examiner

L. A. THAXTON, Assistant Examiner

U.S. Cl. X.R.

260—75, 77.5, 389, 395